United States Patent
Mundhenke et al.

(10) Patent No.: US 9,329,078 B1
(45) Date of Patent: May 3, 2016

(54) SENSOR MODULE FOR AUTOMATIC GUIDED VEHICLES

(71) Applicant: Deere & Company, Moline, IL (US)

(72) Inventors: David D. Mundhenke, Waterloo, IA (US); Phillip C. Mahoney, New Hampton, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/512,540

(22) Filed: Oct. 13, 2014

(51) Int. Cl.
*G01D 11/24* (2006.01)
*G01B 7/14* (2006.01)
*G01J 1/02* (2006.01)
*G05D 1/02* (2006.01)

(52) U.S. Cl.
CPC .............. *G01J 1/0271* (2013.01); *G05D 1/0238* (2013.01); *G01J 2001/0276* (2013.01)

(58) Field of Classification Search
CPC ........................................................ G01B 7/14
USPC ............................................................ 73/431
See application file for complete search history.

(56) References Cited

U.S. PATENT DOCUMENTS

| | | | | |
|---|---|---|---|---|
| 4,944,357 A * | 7/1990 | Wible | ................. | B60L 11/1816 180/169 |
| 6,507,777 B1 * | 1/2003 | Pinlam | ................. | G05D 1/0225 340/988 |
| 6,739,635 B2 * | 5/2004 | Byun | ...................... | B60R 19/28 293/117 |
| 7,100,725 B2 * | 9/2006 | Thorne | ................. | G05D 1/0242 180/169 |
| 7,894,939 B2 * | 2/2011 | Zini | ................... | G05B 19/41895 700/245 |
| 8,751,147 B2 * | 6/2014 | Colwell | ............. | G01R 33/0035 700/245 |
| 2006/0276958 A1 * | 12/2006 | Crumbaugh | ........... | G05D 1/027 701/532 |
| 2010/0266381 A1 * | 10/2010 | Chilson | ................... | B66F 9/063 414/809 |
| 2012/0125707 A1 * | 5/2012 | Frank | ...................... | A63H 18/16 180/169 |
| 2012/0143429 A1 * | 6/2012 | Anderson | ............ | G05D 1/0276 701/25 |
| 2013/0008996 A1 * | 1/2013 | Lehrieder | ............ | B65H 19/126 242/563 |
| 2014/0244097 A1 * | 8/2014 | Colwell | ............... | G05D 1/0212 701/25 |

OTHER PUBLICATIONS

AGV, Protective Light Sensor Bracket for AGVs (1 page), photographs of product commercially available before inventor of present invention.

* cited by examiner

*Primary Examiner* — Lisa Caputo
*Assistant Examiner* — Jamel Williams

(57) ABSTRACT

A sensor module for a vehicle includes a sensor unit enclosed in a housing. The sensor unit has an active end which emits or receives said radiation beam. The housing has a removable cover, a back wall for mounting to the vehicle, a bottom wall, a first end wall and a second end wall spaced apart from the first end wall. The radiation beam is directed through an opening in the first end wall. The active end is internal to the housing and spaced apart internally from the first end wall. A hollow sleeve is received by the opening, and a portion of the sleeve receives at least a portion of the sensor unit. The active end of the sensor unit is inside the sleeve and spaced apart from an end of the sleeve.

13 Claims, 4 Drawing Sheets

SENSOR MODULE FOR AUTOMATIC GUIDED VEHICLES

FIELD

The present disclosure relates to a sensor module for an automatic guided vehicle.

BACKGROUND

Robotic Automatic Guided Vehicles (AGV) are used to move parts and assemblies during manufacturing operations. It is known to mount physical contact type safety stop bumpers along the bottom sides of an AVG. Such a bumper will stop the AGV if it comes in contact with a person or object. Such bumpers are costly to maintain and replace. Optical beam safety sensors have not been used on AGVs because of the dirt, high pressure water contamination and physical abuse present in the factory environments in which they operate. It is desired to provide a protective sensor bracket allows for commercially available optical sensors to be used in this environment.

SUMMARY

According to an aspect of the present disclosure, a sensor module is provided for an automatic guided vehicle (AGV). The sensor module includes a housing and cover which enclose an optical sensor unit. The housing is adapted to be attached to a frame of the AVG. The housing includes a hollow sleeve which is received by an opening in an end wall. The sensor unit has an end portion which is received by the sleeve. The sensor unit emits or receives a radiation beam which is directed along a surface of the frame. The sensor unit has an end which is recessed inwardly from an outer end of the housing.

The sensor unit is recessed inside the sleeve to keep the water and dirt from contacting the active end or lens of the sensor unit. The cover has a top surface which slopes downwards to keep people and objects from resting on it. Drain holes in the housing keep water from accumulating. The housing is strong and is mounted to the vehicle to withstand impact forces.

DETAILED DESCRIPTION OF THE DRAWINGS

Figure 1:
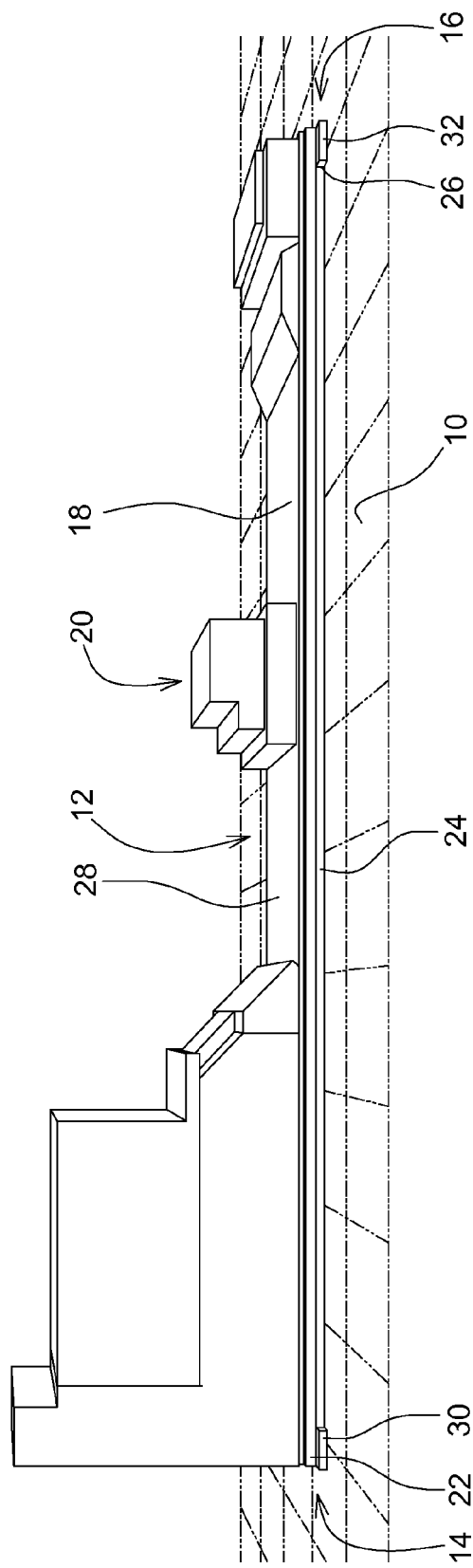
FIG. 1 is a perspective view of an AVG which includes sensor modules embodying the invention.
Figure 2:
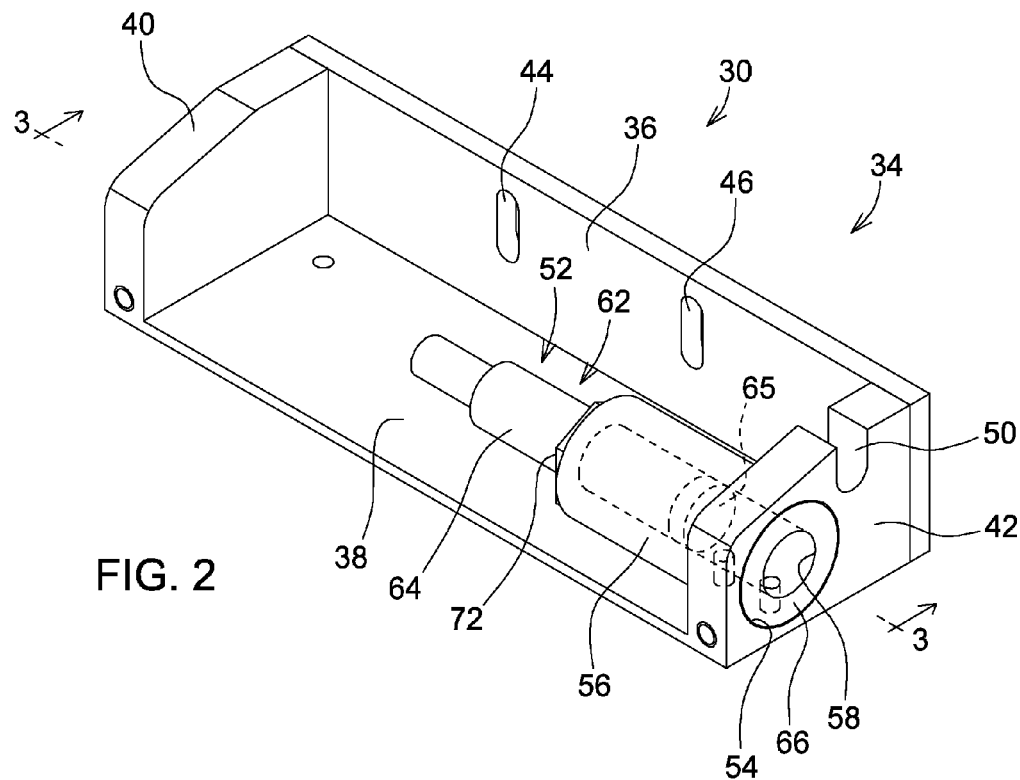
FIG. 2 is a perspective view of the receiver sensor module with cover removed.
Figure 3:
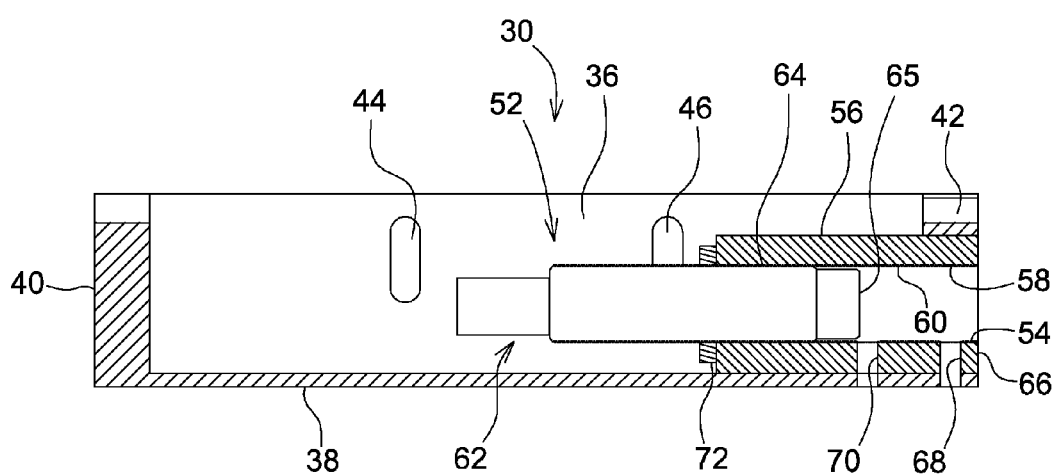
FIG. 3 is a sectional view along lines 3-3 of FIG. 2
Figure 4:
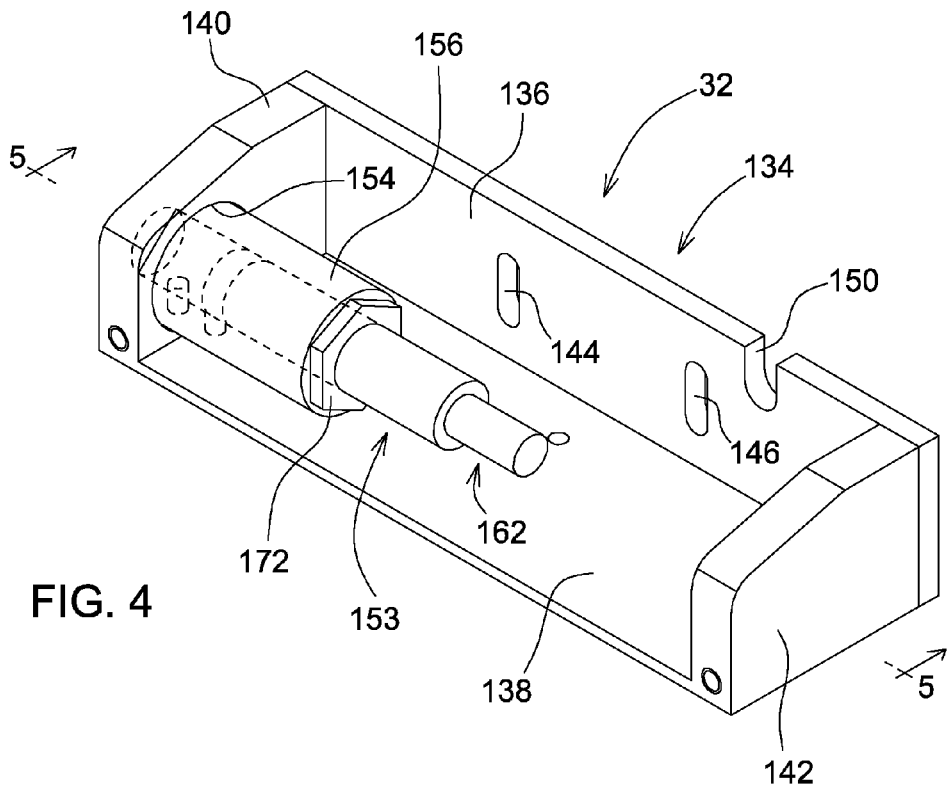
FIG. 4 is a perspective view of the transmitter sensor module with cover removed.

Referring to FIG. 1, an AVG 10 includes a frame 12 which extends from a front end 14 to a rear end 16. The frame 12 supports a platform 18 on which parts 20 can be mounted. The frame 12 has a front end 22, a left side 24, a rear end 26 and a right side 28. A front sensor module 30 is attached to the front end of the left side 24, and a rear sensor module 32 is attached to the rear end of the left side 24. Similar sensor modules (not shown) are attached to the right side 28. As best seen in FIGS. 2 and 3, one of the sensor modules holds a sensor receiver 52, such as a commercially available infrared or laser light receiver. The other sensor module holds a sensor transmitter 53, such as a commercially available infrared or laser light transmitter.

As best seen in FIGS. 2 and 3, the front sensor module 30 includes a bracket or angle member 34 which has a back wall 36, a bottom wall 38, an end wall 40 and an end wall 42. The back wall 36 may include a pair of mounting openings 44, 46. Mounting bolts (not shown) extend through the openings 44, 46 and are threadably received by threaded bores (not shown) in the sides of the frame 12. A slot or opening 50 is formed in the end wall 42 so that cables (not shown) can be routed from a sensor unit 52 to the exterior of the sensor module 30.

The end wall 42 includes an opening 54 which receives an end of a hollow cylindrical sleeve or housing 56. The sleeve 56 may be welded in place in the opening 54. A bore 58 extends through the sleeve 56. Internal threads 60 are formed on an inner end portion of the bore 58. The receiver sensor unit 52 is received by the sleeve 56. Sensor unit 52 has a housing 62. External threads 64 are formed on the housing 62 and are threadably received by the internal threads 60. The sensor unit 52 has an outer end 65 which is spaced apart inwardly from the outer end 66 of the sleeve 56. A pair of drain holes 68 and 70 extend through the sleeve 56 and the bottom wall 38. The drain holes 68 and 70 are positioned between the end wall 42 and the active end 65 of the sensor unit 52. Thus, any liquid which enters the bore 58 will drain out of the bore 58 through the drain holes 68 and 70. A jam nut 72 holds the sensor unit 52 in place in the bore 58.

Figure 5:
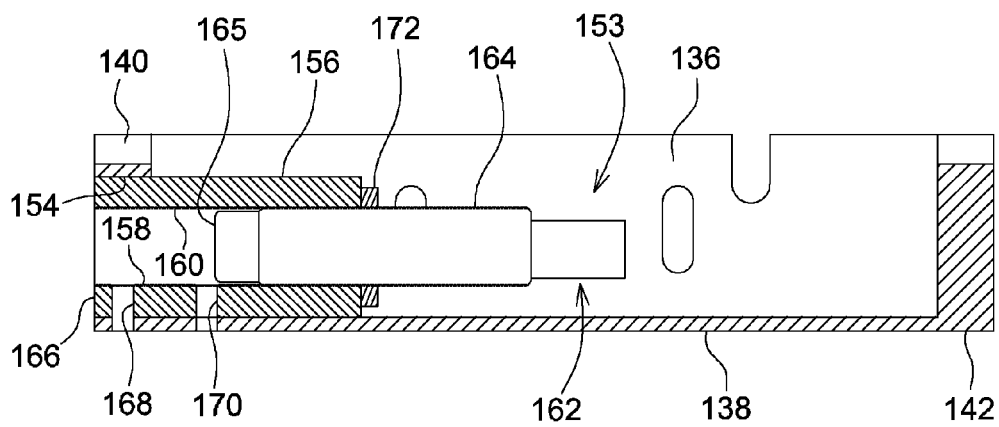
FIG. 5 is a sectional view along lines 5-5 of FIG. 4.

As best seen in FIGS. 3 and 5, the rear sensor module 32 includes a bracket or angle member 134 which has a back wall 136, a bottom wall 138, an end wall 140 and an end wall 142. The back wall 136 may include a pair of mounting openings 144, 146. Mounting bolts (not shown) extend through the openings 144, 146 and are threadably received by threaded bores (not shown) in the sides of the frame 12. A slot or opening 150 is formed in the end wall back wall 136 so that cables (not shown) can be routed from sensor unit 153 to the exterior of the sensor module 32.

The end wall 140 includes an opening 154 which receives an end of a hollow cylindrical sleeve or housing 156. The sleeve 156 may be welded in place in the opening 154. A bore 158 extends through the sleeve 156. Internal threads 160 are formed on an inner end portion of the bore 158. The transmitter sensor unit 153 is received by the sleeve 156. Sensor unit 153 has a housing 162. External threads 164 are formed on the housing 162 and are threadably received by the internal threads 160. The sensor unit 153 has an outer or active end 165 which is spaced apart inwardly from the outer end 166 of the sleeve 156. A pair of drain holes 168 and 170 extend through the sleeve 156 and the bottom wall 138. The drain holes 168 and 170 are positioned between the end wall 140 and the active end 165 of the sensor unit 152. Thus, any liquid which enters the bore 158 will drain out of the bore 158 through the drain holes 168 and 170. A jam nut 172 holds the sensor unit 153 in place in the bore 158.

Figure 6:
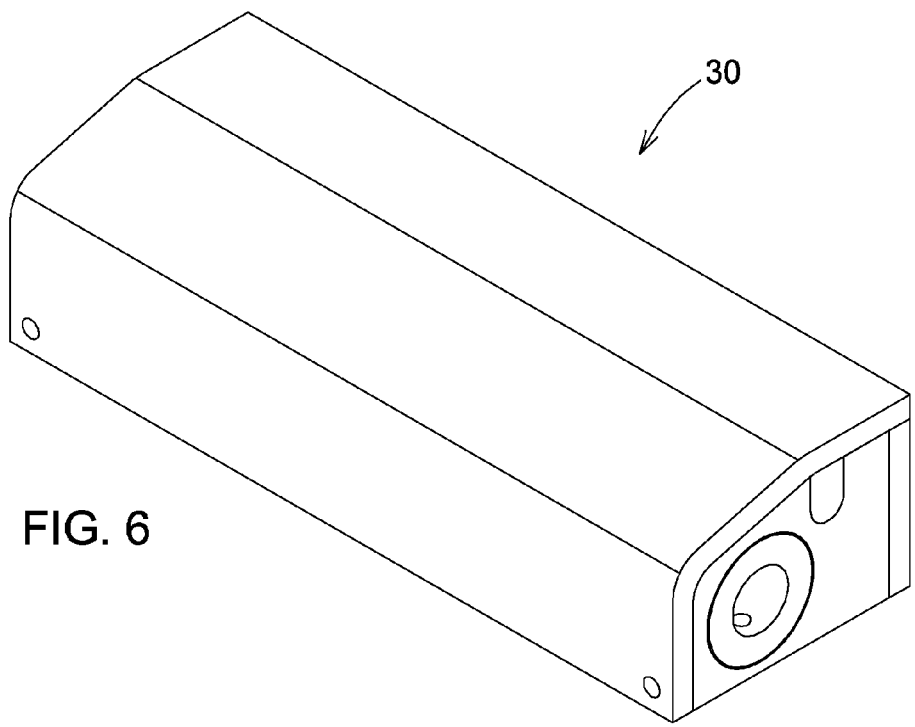
FIG. 6 is a perspective view of the receiver sensor module with cover shown.
Figure 7:
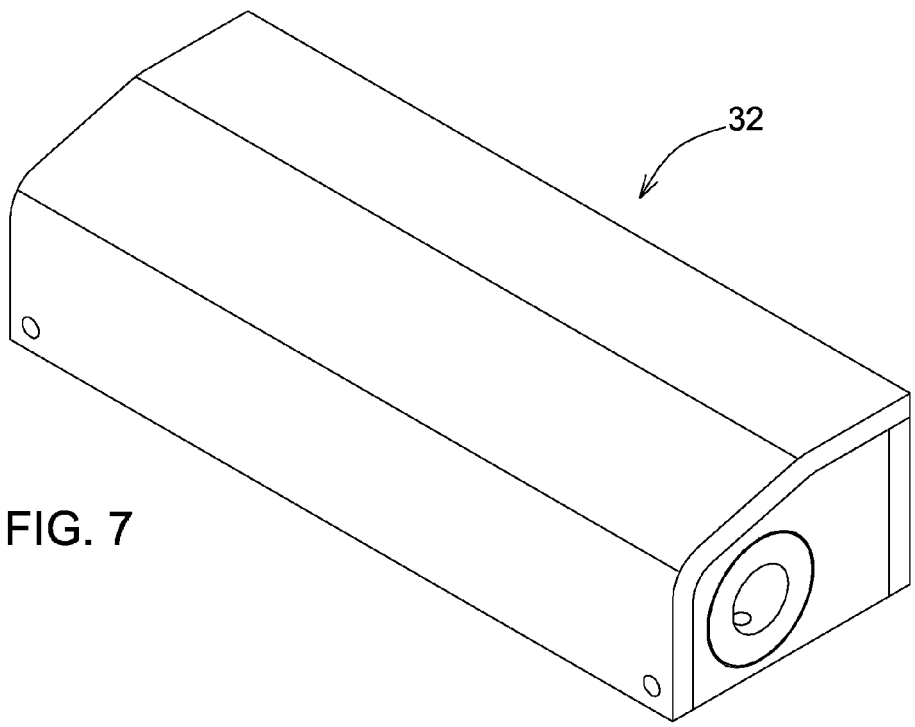
FIG. 7 is a perspective view of the transmitter sensor module with cover shown.

As best seen in FIG. 6, front sensor module 30 includes a cover 74 and rear sensor module 32 includes a cover 174. Both covers have a top surface sloping downwards to keep people and objects from resting on it.

The result is a sensor module which is protected from high pressure wash down, and from airborne dust/dirt which otherwise would cause an optical sensor to fail. The housing also withstands physical damage to it from other equipment, building structures and people standing on them.

In very high dust and mist environments an air tube (not shown) can be added to the sensor's mounting tube to keep a small positive air pressure inside of it, thus preventing even a small amount of contamination from getting on the sensor's lens.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. For example, the entire housing can be formed out of a single piece of material with a bore extending in from one end, instead of a separate sleeve inserted into an opening in an end wall. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A sensor module for a vehicle, the sensor module comprising:
    a sensor unit, the sensor unit having an active end which emits or receives a radiation beam which is directed along an outer surface of the vehicle;
    a housing enclosing the sensor unit, the housing having an end wall with an opening formed therein, the radiation beam being directed through said opening, said active end being internal to the housing and spaced apart internally from the end wall; and
    a hollow sleeve that is received by the opening, the sleeve having a portion which receives a portion of the sensor unit, the active end of the sensor unit being inside the sleeve and spaced apart from an end of the sleeve.

2. The sensor module of claim 1, wherein:
    the housing includes a removable cover.

3. The sensor module of claim 1, wherein:
    the housing comprises cover, a back wall for mounting to the vehicle, a bottom wall, a further end wall spaced apart from the other end wall, the back wall, bottom wall and end walls enclosing the sensor unit.

4. The sensor module of claim 1, wherein:
    the hollow sleeve includes internal threads which engage external threads on the sensor unit.

5. The sensor module of claim 1, wherein the vehicle comprises:
    an automatic guided vehicle (AGV).

6. The sensor module of claim 1, further comprising:
    a drain hole having a lower end which opens at a bottom surface of the housing, and having an upper end which opens near the active end of the sensor unit.

7. The sensor module of claim 6, wherein:
    the drain hole is positioned between the end wall and the active end of the sensor unit.

8. A sensor module for a vehicle, the sensor module comprising:
    a sensor unit, the sensor unit having an active end which emits or receives a radiation beam which is directed along an outer surface of the vehicle;
    a housing enclosing the sensor unit, the housing having a cover, a back wall for mounting to the vehicle, a bottom wall, a first end wall, a second end wall spaced apart from the first end wall, the back wall, bottom wall, cover and end walls enclosing the sensor unit, the first end wall having an opening formed therein, the radiation beam being directed through said opening, said active end being internal to the housing and spaced apart internally from the first end wall; and;
    a hollow sleeve that is received by the opening, a portion of the hollow sleeve receiving at least a portion of the sensor unit, the active end of the sensor unit being inside the sleeve and spaced apart from an end of the sleeve.

9. The sensor module of claim 8, wherein:
    the cover is removable.

10. The sensor module of claim 8, wherein:
    the hollow sleeve includes internal threads which engage external threads on the sensor unit.

11. The sensor module of claim 8, wherein the vehicle comprises:
    an automatic guided vehicle (AGV).

12. The sensor module of claim 8, further comprising:
    a drain hole having a lower end which opens at a bottom surface of the housing, and having an upper end which opens near the active end of the sensor unit.

13. The sensor module of claim 12, wherein:
    the drain hole is positioned between the end wall and the active end of the sensor unit.

* * * * *